United States Patent
Guen et al.

(10) Patent No.: US 10,084,164 B2
(45) Date of Patent: Sep. 25, 2018

(54) SECONDARY BATTERY

(71) Applicant: SAMSUNG SDI CO., LTD., Yongin-si, Gyeonggi-do (KR)

(72) Inventors: Minhyung Guen, Yongin-si (KR); Yongchul Seo, Yongin-si (KR); Seungho Kwak, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 215 days.

(21) Appl. No.: 14/988,640

(22) Filed: Jan. 5, 2016

(65) Prior Publication Data

US 2017/0040579 A1 Feb. 9, 2017

(30) Foreign Application Priority Data

Aug. 7, 2015 (KR) .......................... 10-2015-0111582

(51) Int. Cl.
*H01M 4/04* (2006.01)
*H01M 2/04* (2006.01)
(Continued)

(52) U.S. Cl.
CPC ......... *H01M 2/0473* (2013.01); *H01M 2/043* (2013.01); *H01M 2/0486* (2013.01);
(Continued)

(58) Field of Classification Search
CPC ...... H01M 2/04; H01M 2/043; H01M 2/0473; H01M 2/06
(Continued)

(56) References Cited

U.S. PATENT DOCUMENTS

2014/0141319 A1* 5/2014 Kim .................. H01M 2/32
429/179
2014/0272550 A1* 9/2014 Ishii .................. H01M 2/30
429/179
(Continued)

FOREIGN PATENT DOCUMENTS

EP 2 779 280 A2 9/2014
KR 10-2014-0147313 A 12/2014
(Continued)

OTHER PUBLICATIONS

European Search Report dated Jun. 21, 2016 in corresponding EP Application No. 16163205.4-1360, 8 pages.

*Primary Examiner* — Jonathan G Leong
(74) *Attorney, Agent, or Firm* — Lewis Roca Rothgerber Christie LLP

(57) ABSTRACT

A secondary battery includes: an electrode assembly; a case accommodating the electrode assembly and having an opening at one side thereof; a cap plate closing the opening of the case and having a first recessed groove at one end thereof and a second recessed groove at another end thereof, both the first and second recessed grooves being at an outer surface of the cap plate; a first terminal unit including: a first electrode terminal electrically connected to a first electrode plate and protruding outside of the case; a first terminal plate electrically connected to the first electrode terminal; and an insulation member coupled to the cap plate in the first recessed groove and surrounding peripheral surfaces and a bottom surface of the first terminal plate; and a second terminal unit electrically connected to the second electrode plate and coupled to the cap plate in the second recessed groove.

5 Claims, 7 Drawing Sheets

(51) Int. Cl.
  *H01M 2/30* (2006.01)
  *H01M 2/34* (2006.01)
  *H01M 2/06* (2006.01)
  *H01M 10/04* (2006.01)
  *H01M 2/02* (2006.01)
  *H01M 2/12* (2006.01)

(52) U.S. Cl.
  CPC .............. *H01M 2/06* (2013.01); *H01M 2/30* (2013.01); *H01M 2/305* (2013.01); *H01M 2/345* (2013.01); *H01M 10/0431* (2013.01); *H01M 2/0237* (2013.01); *H01M 2/1241* (2013.01); *H01M 2200/20* (2013.01); *H01M 2220/20* (2013.01)

(58) Field of Classification Search
  USPC ......................................... 429/163, 175–182
  See application file for complete search history.

(56) References Cited

U.S. PATENT DOCUMENTS

| | | |
|---|---|---|
| 2014/0377600 A1 | 12/2014 | Guen |
| 2015/0037628 A1 | 2/2015 | Guen |
| 2015/0079429 A1 | 3/2015 | Han et al. |
| 2015/0207118 A1 | 7/2015 | Guen et al. |

FOREIGN PATENT DOCUMENTS

| | | |
|---|---|---|
| KR | 10-2015-0016778 A | 2/2015 |
| KR | 10-2015-0030985 A | 3/2015 |

\* cited by examiner

SECONDARY BATTERY

CROSS-REFERENCE TO RELATED APPLICATION

This application claims priority to and the benefit of Korean Patent Application No. 10-2015-0111582, filed on Aug. 7, 2015 in the Korean Intellectual Property Office, and all the benefits accruing therefrom under 35 U.S.C. 119, the contents of which are herein incorporated by reference in their entirety.

BACKGROUND

1. Field

The present invention relates to a secondary battery.

2. Description of the Related Art

Unlike primary batteries which are not designed to be recharged, secondary batteries are designed to be repeatedly charged and discharged. Low-capacity secondary batteries, each using a single battery cell packaged in a battery pack, are widely employed in small-sized portable electronic devices, such as cellular phones or camcorders, while large-capacity secondary batteries, each using tens of battery cells connected to each other in a battery pack, are typically used for driving motors of hybrid automobiles or the like.

Secondary batteries may be manufactured in various shapes, including cylindrical and prismatic shapes. The prismatic secondary battery may generally include an electrode assembly, a case accommodating the electrode assembly with an electrolyte, electrode terminals electrically connected to the electrode assembly and exposed or protruding to outside of the case, and terminal plates electrically connected to the electrode terminals on a cap plate.

Prismatic secondary batteries may be mounted in a vehicle in a state in which the terminal plates of adjacent secondary batteries are connected to each other through a bus bar. In this case, the terminal plates may rotate or vibrate due to vibration of the vehicle, and an external force may be applied to the cap plate by the rotation or vibration of the terminal plates resulting in physical deformation, such as warp or distortion. When a short-circuit plate is installed in the cap plate to induce an electric short during overcharge of the secondary battery, the short-circuit plate may also become unintentionally deformed, thereby considerably lowering safety of the secondary battery.

SUMMARY

Embodiments of the present invention provide a secondary battery which has increased coupling strength of a short-circuit plate to a cap plate and bending strength of the cap plate to reduce or minimize deformation of the cap plate due to external forces and which also reduces an unused volume of a case.

The above and other aspects of the present invention will be described in or will be apparent from the following description of exemplary embodiments of the present invention.

According to an embodiment of the present invention, a secondary battery includes: an electrode assembly including a first electrode plate, a second electrode plate, and a separator between the first electrode plate and the second electrode plate; a case accommodating the electrode assembly and having an opening at one side thereof; a cap plate closing the opening of the case and having a first recessed groove at one end thereof and a second recessed groove at another end thereof, both the first and second recessed grooves being at an outer surface of the cap; a first terminal unit including: a first electrode terminal electrically connected to the first electrode plate and protruding outside of the case; a first terminal plate electrically connected to the first electrode terminal; and an insulation member coupled to the cap plate in the first recessed groove and surrounding peripheral surfaces and a bottom surface of the first terminal plate; and a second terminal unit electrically connected to the second electrode plate and coupled to the cap plate in the second recessed groove.

The second terminal unit may include: a second electrode terminal electrically connected to the second electrode plate and extending through the cap plate to protrude outside of the case; a second terminal plate electrically connected to the second electrode terminal; and a top plate coupled to the cap plate in the second recessed groove and contacting a bottom surface of the second terminal plate and peripheral surfaces and a bottom surface of the second recessed groove.

A first penetration opening may be in the cap plate at one end of the first recessed groove and the first electrode terminal may pass therethrough, a first short-circuit opening may be in the cap plate at another end of the first recessed groove, and an inversion plate configured to be inverted when an internal pressure of the case exceeds a certain pressure and short-circuit with the first terminal plate may be coupled to the cap plate at the first short-circuit opening, a second penetration opening may be in the cap plate at one end of the insulation member and the second electrode terminal may pass therethrough, and a second short-circuit opening may be at another end of the insulation member to correspond to the inversion plate, and a coupling opening may be at one end of the first terminal plate and the first electrode terminal may pass therethrough and may be riveted to the first electrode plate, and a protrusion may protrude to a bottom surface of the second terminal plate at another end thereof, may be in the second short-circuit opening, and may be configured to electrically contact the inversion plate when the inversion plate becomes inverted.

A protrusion may be on the peripheral surfaces of the first terminal plate, an insertion opening may be in the peripheral surfaces of the insulation member, and the protrusion may be inserted into the insertion opening.

An inner surface of the cap plate below the first recessed groove protrudes toward the electrode assembly.

According to an embodiment of the present invention, a secondary battery includes: an electrode assembly including a first electrode plate, a second electrode plate, and a separator between the first electrode plate and the second electrode plate; a case accommodating the electrode assembly and having an opening at one side thereof; a cap plate closing the opening of the case and having a first recessed groove and a second recessed groove at an outer surface thereof, the first and second recessed grooves being at opposite ends of the cap plate; a first terminal unit electrically connected to the first electrode plate and coupled to the cap plate at the first recessed groove; and a second terminal unit electrically connected to the second electrode plate and including: a second electrode terminal protruding outside of the case; a second terminal plate electrically connected to the second electrode terminal; and a top plate in the second recessed groove and contacting a bottom surface of the second terminal plate and peripheral surfaces and a bottom surface of the second recessed groove.

The first terminal unit may include: a first electrode terminal electrically connected to the first electrode plate and extending through the cap plate to protrude outside of the case; a first terminal plate electrically connected to the first electrode terminal; and an insulation member in the first recessed groove and surrounding peripheral surfaces and a bottom surface of the first terminal plate.

A protruding terminal may protrude from and extend along edges of outer surface of the top plate such that the second terminal plate is on the outer surface of the top plate and peripheral surfaces of the second terminal plate are surrounded by the protruding terminal, and the outer surface of the top plate and the outer surface of the cap plate may be substantially coplanar.

A first penetration opening may be in the cap plate at one end of the second recessed groove and the second electrode terminal may pass therethrough, a second penetration opening may be at one end of the top plate, a third penetration opening may be at another end of the top plate, a coupling opening may be at one end of the second terminal plate and the second electrode terminal may extend through the coupling opening and may be riveted to the second terminal plate, and a protrusion may protrude from a bottom surface of another end of the second terminal plate and may extend into the third penetration opening.

An inner surface of cap plate below the second recessed groove may protrude toward the electrode assembly.

As described above, the secondary battery according to an embodiment of the present invention has improved coupling strength of a short-circuit plate to a cap plate and bending strength of the cap plate which can reduce or minimize deformation of the cap plate due to external forces and also reduces an unused volume of a case.

BRIEF DESCRIPTION OF THE DRAWINGS

The above and other features and aspects of the present invention will become more apparent by describing, in detail, exemplary embodiments thereof with reference to the attached drawings in which.

DETAILED DESCRIPTION

Figure 1:
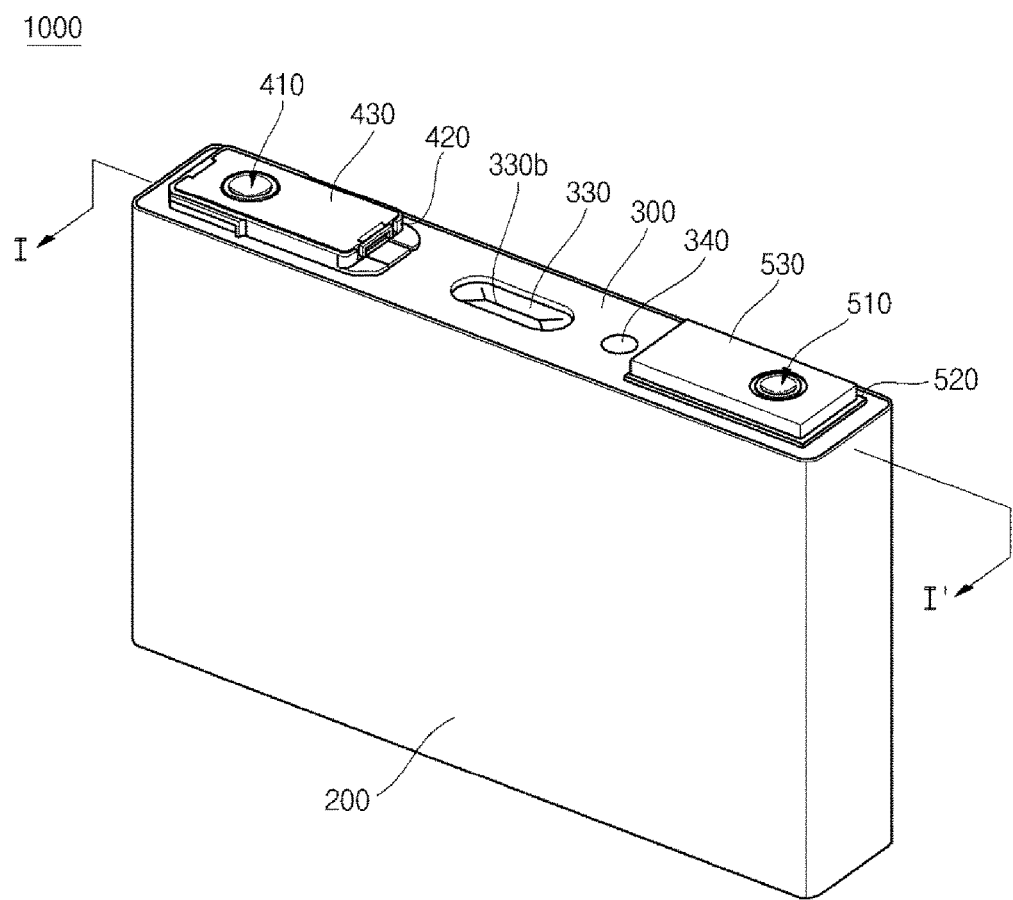
FIG. 1 is a perspective view of a secondary battery according to an embodiment of the present invention.

Hereinafter, examples of embodiments of the present invention will be described, in detail, with reference to the accompanying drawings such that they can easily be made and used by those skilled in the art.

It will be understood that when an element or layer is referred to as being "on," "connected to," or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Figure 2:
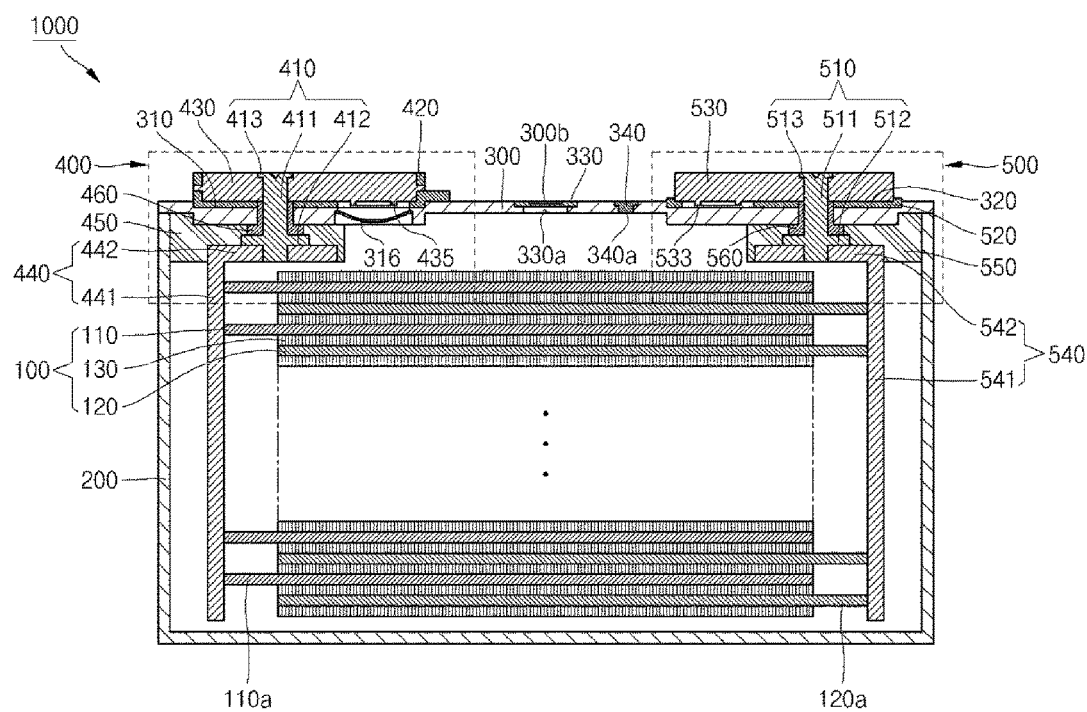
FIG. 2 is a cross-sectional view taken along the line I-I' of FIG. 1.
Figure 3:
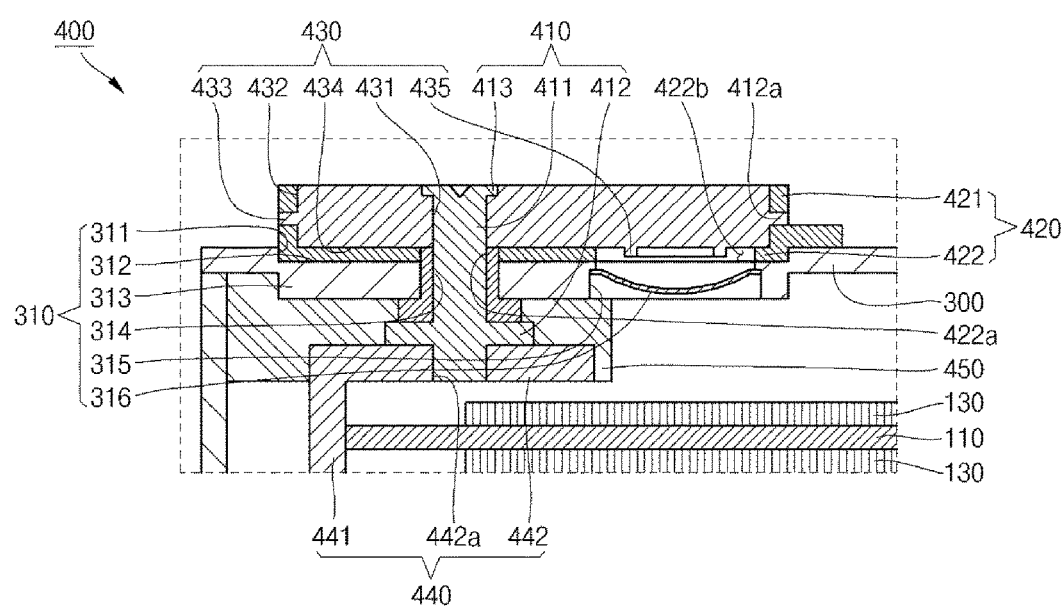
FIG. 3 is an enlarged cross-sectional view of a first terminal unit illustrated in FIG. 1.
Figure 4:
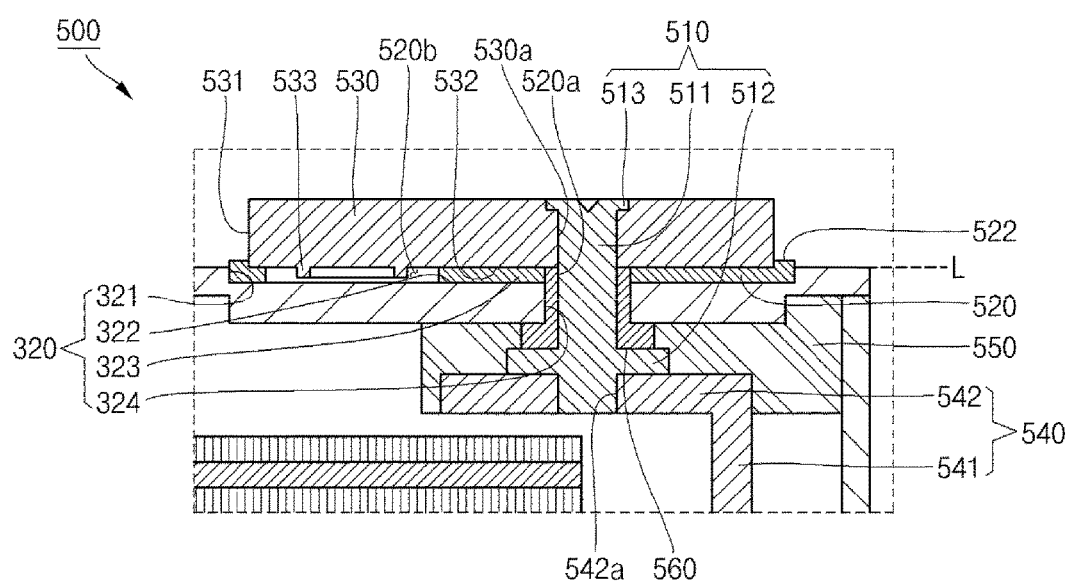
FIG. 4 is an enlarged cross-sectional view of a second terminal unit illustrated in FIG. 1.
Figure 5A:
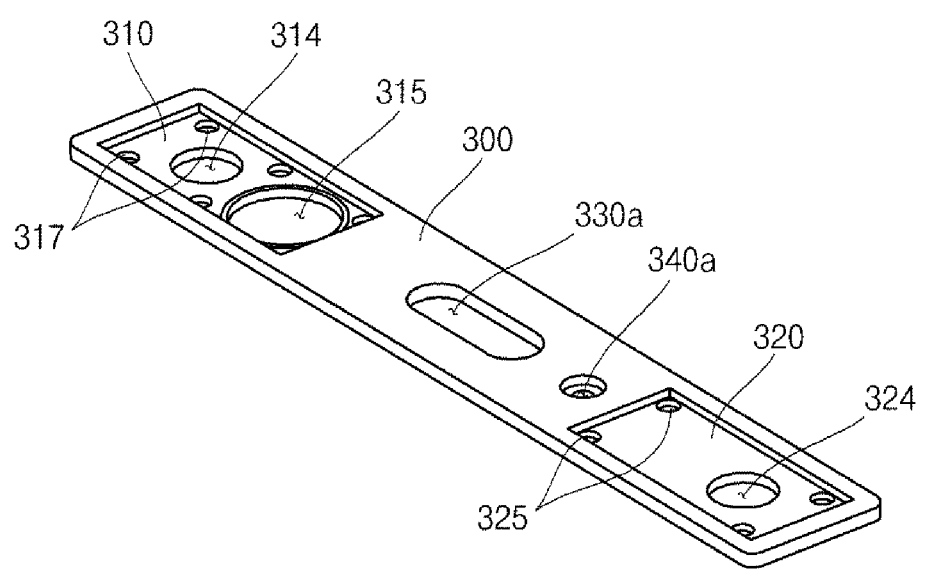
FIG. 5A is a top perspective view of a cap plate according to an embodiment of the present invention.
Figure 5B:
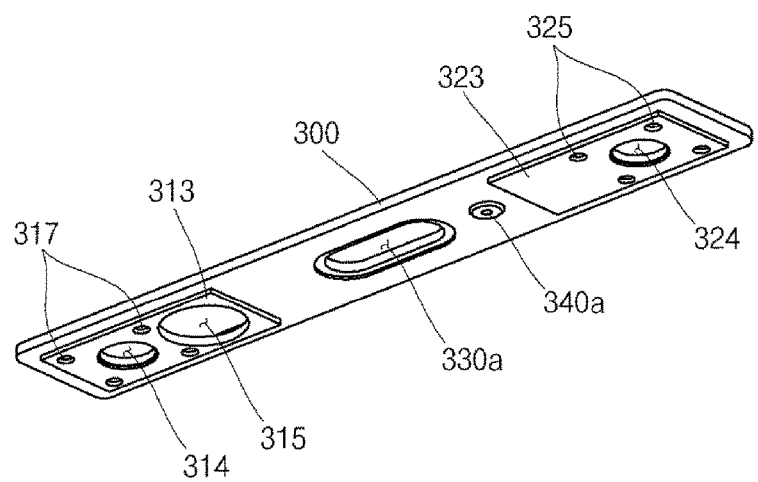
FIG. 5B is a bottom perspective view of the cap plate illustrated in FIG. 5A.

FIG. 1 is a perspective view of a secondary battery (1000) according to an embodiment of the present invention, FIG. 2 is a cross-sectional view of the secondary battery (1000), taken along the line I-I' of FIG. 1, FIG. 3 is an enlarged cross-sectional view of a first terminal unit (400) illustrated in FIG. 1, FIG. 4 is an enlarged cross-sectional view of a second terminal unit (500) illustrated in FIG. 1, FIG. 5A is a top perspective view of a cap plate (300) according to an embodiment of the present invention, and FIG. 5B is a bottom perspective view of the cap plate (300) illustrated in FIG. 5A.

Referring to FIGS. 1 to 5B, a secondary battery 1000 according to an embodiment of the present invention includes an electrode assembly 100, a case 200, a cap plate 300, a first terminal unit 400, and a second terminal unit 500.

The electrode assembly 100 is formed by winding or stacking a first electrode plate 110, a separator 130, and a second electrode plate 120, each of which may be a thin plate or film. The first electrode plate 110 may function as a negative electrode, and the second electrode plate 120 may function as a positive electrode.

The first electrode plate 110 may be formed by applying a first electrode active material, such as graphite or carbon, onto a first electrode collector formed of a metal foil, such as a copper or a nickel foil. The first electrode plate 110 may include a first electrode uncoated portion 110a to which the first electrode active metal is not applied. The first electrode uncoated portion 110a may function as a current flow passage between the first electrode plate 110 and the outside of the first electrode plate 110. Materials that can be used to form the first electrode plate 110 are not limited to those disclosed herein.

The second electrode plate 120 may be formed by applying a second electrode active material, such as a transition metal oxide, onto a second electrode collector formed of a metal foil, such as an aluminum foil. The second electrode plate 120 may include a second electrode uncoated portion 120a to which the second electrode active metal is not applied. The second electrode uncoated portion 120a may function as a passage for current between the second electrode plate 120 and the outside of the second electrode plate 120. Materials that can be used to form the second electrode plate 120 are not limited to those disclosed herein.

The separator 130 is disposed between the first electrode plate 110 and the second electrode plate 120. The separator 130 prevents short circuiting from occurring between the first and second electrode plates 110 and 120 and allows movement of lithium ions. The separator 130 may be formed of a polyethylene film or a film including polyethylene and polypropylene. Materials that can be used to form the separator 130 are not limited to those disclosed herein.

The case 200 may be formed of a conductive metal, such as aluminum, an aluminum alloy, or steel plated with nickel. The case 200 may have an approximately hexahedral shape with an opening so that the electrode assembly 100, a first current collector 440, and a second current collector 540 can be inserted and placed in (e.g., accommodated in) the case 200. Because a configuration in which the case 200 is assembled with the cap plate 300 is illustrated in FIG. 2, the opening is not visible. However, the peripheral part of the cap plate 300 corresponds to the opening. In one embodiment, the inner surface of the case 200 may be treated to be electrically insulated from the electrode assembly 100, the first current collector 440, and the second current collector 540. In another embodiment, the case 200 may function as an electrode having a polarity, for example, a positive electrode.

The cap plate 300 has an approximately rectangular shape to seal the opening of the case 200. The cap plate 300 may be formed of the same material as that of the case 200, and the cap plate 300 and the case 200 may have the same polarity as each other.

A first recessed groove 310 may be formed at one end of the cap plate 300 and a second recessed groove 320 may be formed at another end (e.g., an opposite end) of the cap plate 300.

The first recessed groove 310 may be configured such that a portion of an upper surface at one end of the cap plate 300 (e.g., an outer surface, a top surface, or an exposed surface of the cap plate 300) is recessed to a certain depth (e.g., a predetermined depth), and the first recessed groove 310 may be defined by internal side surfaces 311 and a bottom surface 312. A bottom portion 313 of the cap plate 300 below the first recessed groove 310 (e.g., at an inner surface of the cap plate 300) may be configured to protrude toward the electrode assembly 100 as much as (e.g., a same distance as) the first recessed groove 310 is recessed from the upper surface of the cap plate 300.

A first penetration opening 314 (e.g., a first penetration hole) may be formed at one end of the first recessed groove 310 and a first short-circuit opening 315 (e.g., a first short-circuit hole) may be formed at another end (e.g., an opposite end) of the first recessed groove 310. A first electrode terminal 410 may pass through the first penetration opening 314 and an inversion plate 316 may be coupled to the cap plate 300 at the first short-circuit opening 315. The inversion plate 316 may have a shape of an approximately recessed round plate. The inversion plate 316 may invert (e.g., may be inverted) to upwardly protrude when the internal pressure of the case 200 exceeds a certain pressure (e.g., a preset pressure) due to heat generation and electrolyte decomposition due to a high-voltage disconnection or an overcharge of the secondary battery 1000 when the secondary battery 1000 is connected to an external circuit. The inversion plate 316 and the cap plate 300 have the same polarity as each other. When the inversion plate 316 is inverted, it comes into contact with a second terminal plate 530 to cause short circuiting (e.g., internal short-circuiting).

When the short circuiting occurs, a relatively large amount of current flows through the secondary battery 1000 to generate heat, thereby allowing a fuse (e.g., a fuse part) to operate (e.g., to melt). The fuse may be formed at the first terminal unit 400 or the second terminal unit 500, but the present embodiment does not specifically limit a position of the fuse.

An upper insulation member 420 may be mounted in the first recessed groove 310. A plurality of first openings 317 (e.g., first holes) may be formed in the first recessed groove 310. A plurality of first protrusions formed on a bottom surface of the upper insulation member 420 are inserted into the plurality of first openings 317, thereby allowing the upper insulation member 420 to be engaged with the cap plate 300 at the first recessed groove 310.

The second recessed groove 320 may be configured such that the upper surface of the other edge of the cap plate 300 is recessed to a certain depth (e.g., a predetermined depth) and may be defined by internal side surfaces 321 and a bottom surface 322. A bottom portion 323 of the cap plate 300 (e.g., an inner surface of the cap plate 300) below the second recessed groove 320 may be configured to protrude toward the electrode assembly 100 as much as the second recessed groove 320 is recessed from the upper surface of the cap plate 300.

A second penetration opening 324 (e.g., a second penetration hole) may be formed at one end of the second recessed groove 320. A second electrode terminal 510 may pass through the second penetration opening 324.

Because the first recessed groove 310 and the second recessed groove 320 improve the bending strength of the cap plate 300 (e.g., increase the rigidity of the cap plate 300), unintentional deformation of the inversion plate 316 may be prevented or avoided. In addition, the overall height of the secondary battery 1000 can be reduced by reducing protruding heights of the first electrode terminal 410 and the second electrode terminal 510 above the cap plate 300, and a void volume (e.g., an unused interior space) of the case 200 can be reduced. Further, because the void volume of the case 200 is reduced, a vent plate 330 may operate rapidly, thereby increasing a gas release speed of the secondary battery 1000. Moreover, the electrode assembly 100 can be stably fixed to the inside of the case 200.

A vent opening 330a (e.g., a vent hole) may be formed in the cap plate 300, and the vent plate 330 may be coupled to the cap plate 300 at the vent opening 330a. A notch 330b may be formed in the vent plate 330. The notch 330b may be configured to open at a certain (e.g., a present) internal pressure of the case 200 (e.g., the vent plate 330 may be configured to open or burst at a certain internal pressure of the case 200 due to the notch 330b).

An electrolyte injection opening 340a (e.g., an electrolyte injection hole) may be formed in the cap plate 300, and a plug 340 may be placed in (e.g., engaged with) the electrolyte injection opening 340a, thereby sealing the electrolyte injection opening 340a.

The first terminal unit 400 may include the first electrode terminal 410, the upper insulation member 420, the first terminal plate 430, the first current collector 440, a first lower insulation member 450, and a first gasket 460.

The first electrode terminal 410 may include a first body 411, a first flange 412, and a first riveting part 413 (e.g., a first rivet).

A top portion of the first body 411 may pass through the first penetration opening 314 in the first recessed groove 310 to upwardly protrude from the cap plate 300, and a bottom portion of the first body 411 may be electrically connected to the first current collector 440. The first body 411 may be roughly pillar-shaped. An upper portion (e.g., an upper pillar) of the first body 411 may be riveted and coupled to the first terminal plate 430 at a first coupling opening 431 (e.g., a first coupling hole) therein, and a lower portion (e.g., a lower pillar) of the first body 411 may be fitted into a second coupling opening 442a (e.g., a second coupling hole) in the first current collector 440. The first flange 412 is formed at the lower portion of the first body 411, thereby preventing the first electrode terminal 410 from becoming dislodged from the cap plate 300.

The upper insulation member 420 may have an approximately rectangular parallelepiped shape having a sidewall 421 and a bottom wall 422. A bottom portion of the upper insulation member 420 is mounted to the cap plate 300 in the first recessed groove 310, and the first protrusions formed on the bottom surface of the upper insulation member 420 are inserted into the first openings 317 of the first recessed groove 310, thereby more tightly fixing the upper insulation member 420 to the cap plate 300 at the first recessed groove 310.

At least one insertion opening 421a (e.g., at least one insertion hole) may be formed in the sidewall 421 of the upper insulation member 420. A second protrusion 433 formed on the first terminal plate 430 is inserted into the least one insertion opening 421a. Thereby, the first terminal plate 430 can be more tightly fixed to the upper insulation member 420.

A third penetration opening 422a (e.g., a third penetration hole) may be formed at one edge of the bottom wall 422 of the upper insulation member 420 and a second short-circuit opening 422b (e.g., a second short-circuit hole) may be formed at another end of the bottom wall 422 of the upper insulation member 420. The first electrode terminal 410 may pass through the third penetration opening 422a, and a first protruding part 435 (e.g., a first protrusion) of the first terminal plate 430 may be positioned in the second short-circuit opening 422b.

As described above, the upper insulation member 420 is tightly fixed to the cap plate 300 at the first recessed groove 310, thereby tightly fixing the first terminal plate 430 to the cap plate 300 by the upper insulation member 420 and increasing bending strength (e.g., rigidity) of the cap plate 300.

The first terminal plate 430 may have an approximately rectangular parallelepiped shape and may be inserted into the inside of the upper insulation member 420.

The second protrusion 433 may be formed on the side surface 432 of the first terminal plate 430. The second protrusion 433 may be inserted into the insertion opening 421a formed in the sidewall 421 of the upper insulation member 420.

The first coupling opening 431 may be formed at one edge of the first terminal plate 430. The first electrode terminal 410 may pass through the first coupling opening 431 and a top portion of the first electrode terminal 410 may be riveted and coupled to the first electrode plate at the first coupling opening 431. The first protruding part 435 may be formed at the other end of a bottom surface 434 of the first terminal plate 430. The first protruding part 435 may be positioned in the second short-circuit opening 422b formed in the upper insulation member 420. The first protruding part 435 may be approximately ring-shaped and may electrically contact an upper surface of the inversion plate 316 during operation of the inversion plate 316 (e.g., when the inversion plate 316 is deformed to protrude upwardly), thereby causing short circuiting.

The first current collector 440 may include a first connecting part 441 (e.g., a first connector) and a first extending part 442 (e.g., a first extending portion). The first connecting part 441 may be electrically connected to the first electrode uncoated portion 110a of the first electrode plate 110. The first extending part 442 may be horizontally bent from the first connecting part 441. The second coupling opening 442a may be formed in the first extending part 442, and the lower portion of the first electrode terminal 410 may be inserted into the second coupling opening 442a.

The first lower insulation member 450, interposed between the cap plate 300 and the first current collector 440, may prevent unintentional short circuiting from occurring therebetween.

The first gasket 460, interposed between the first electrode terminal 410 and the first and third penetration openings 314 and 422a, may prevent external moisture from penetrating through the first and third penetration openings 314 and 422a.

The second terminal unit 500 may include the second electrode terminal 510, a top plate 520, the second terminal plate 530, the second current collector 540, a second lower insulation member 550, and a second gasket 560.

The second electrode terminal 510 may include a second body 511, a second flange part 512 (e.g., a second flange), and a second riveting part 513 (e.g., a second rivet).

A top portion of the second body 511 may pass through the second penetration opening 324 in the second recessed groove 320 to protrude above the upper surface of the cap plate 300, and a bottom portion of the second body 511 may be electrically connected to the second current collector 540.

The second body 511 may be approximately pillar-shaped. An upper portion (e.g., an upper pillar) of the second body 511 may be riveted and coupled to the second terminal plate 530 at a third coupling opening 530a (e.g., a third coupling hole) therein, and a lower portion (e.g., a lower pillar) of the second body 511 may be fitted into a fourth coupling opening 542a (e.g., a fourth coupling hole) in the second current collector 540. The second flange part 512 is formed at the lower portion of the second body 511, thereby preventing the second electrode terminal 510 from being unintentionally dislodged from the cap plate 300.

The top plate 520 may be shaped and sized to correspond to the second recessed groove 320. For example, the top plate 520 may have an approximately rectangular plate shape. When the top plate 520 is mounted in the second recessed groove 320, a side surface and a bottom surface of the top plate 520 are brought into close contact with the internal side surfaces 321 and the bottom surface 322 of the second recessed groove 320, and the upper surface of the top plate 520 may be positioned on substantially the same line L as the upper surface of the cap plate 300 (e.g., the upper surface of the top plate 520 may be coplanar with the upper surface of the cap plate 300).

A fourth penetrating opening 520a (e.g., a fourth penetrating hole) may be formed at one end of the top plate 520, and a fifth penetrating opening 520b (e.g., a fifth penetrating hole) may be formed at the other end of the top plate 520. The second electrode terminal 510 may pass through the fourth penetrating opening 520a, and a second protruding part 533 of the second terminal plate 530 may be positioned in the fifth penetrating opening 520b.

A protruding terminal 522 may be formed on the upper surface of the top plate 520 to protrude along an edge or a periphery of the upper surface of the top plate 520. The protruding terminal 522 of the top plate 520 may serve to bind the second terminal plate 530 so as not to rotate or vibrate with respect to the top plate 520.

As described above, the top plate 520 is tightly fixed to the second recessed groove 320, thereby increasing a coupling strength between the second terminal plate 530 and the top plate 520. In addition, the top plate 520 may be formed of a stainless material (e.g., stainless steel), thereby further increasing the rigidity (e.g., the bending strength) of the cap plate 300.

The second terminal plate 530 may have an approximately rectangular parallelepiped shape and may have the same or substantially the same shape as the first terminal plate 430. Accordingly, common use of terminal plates is allowed.

The second terminal plate 530 may be mounted on the upper surface of the top plate 520 and may be fixed to the upper surface of the top plate 520 so as not to rotate or vibrate by or with respect to the protruding terminal 522.

The third coupling opening 530a may be formed at one end of the second terminal plate 530. The second electrode terminal 510 may pass through the third coupling opening 530a, and a top portion of the second electrode terminal 510 may be riveted and coupled to the second terminal plate 530 at the third coupling opening 530a.

The second current collector 540 may include a second connecting part 541 (e.g., a second connector) and a second extending part 542. The second connecting part 541 may be electrically connected to the second electrode uncoated portion 120a of the second electrode plate 120. The second extending part 542 may be horizontally bent from the second connecting part 541. The fourth coupling opening 542a may be formed in the second extending part 542, and the lower portion of the second electrode terminal 510 may be inserted into the fourth coupling opening 542a.

The second lower insulation member 550, interposed between the cap plate 300 and the second current collector 540, may prevent unintentional short circuiting from occurring therebetween.

The second gasket 560, interposed between the second electrode terminal 510 and the second and fifth penetration openings 324 and 520b, may prevent external moisture from penetrating through the second and fifth penetration openings 324 and 520b.

Figure 6:
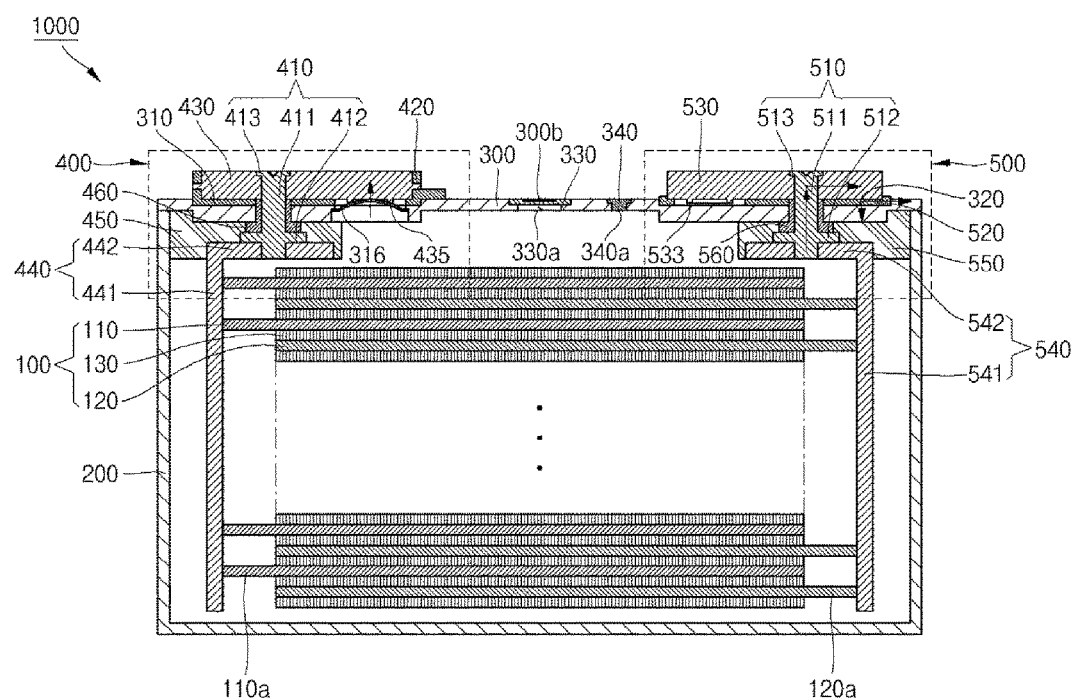
FIG. 6 is a cross-sectional view illustrating the configuration of a secondary battery during overcharge.
Figure 7:
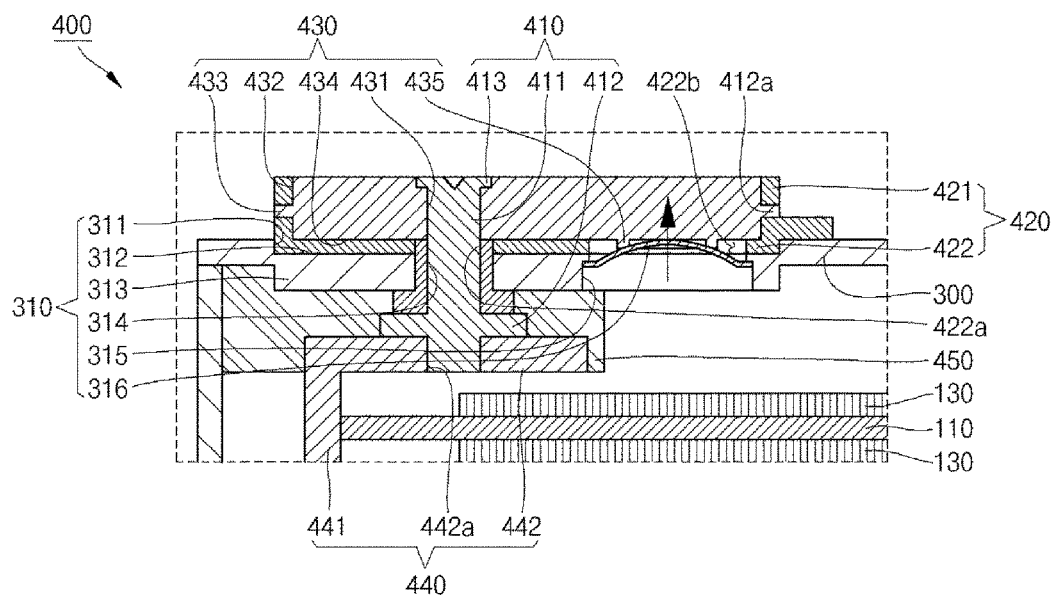
FIG. 7 is an enlarged cross-sectional view of a first terminal unit illustrated in FIG. 6.
Figure 8:
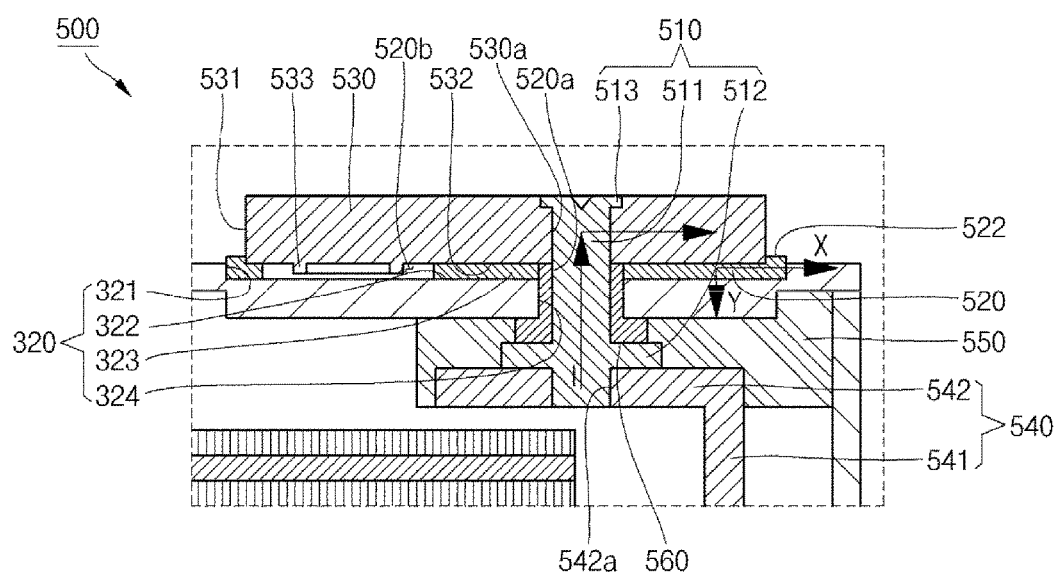
FIG. 8 is an enlarged cross-sectional view of a second terminal unit illustrated in FIG. 6.

FIG. 6 is a sectional view illustrating the configuration of a secondary battery (1000) during overcharge, FIG. 7 is an enlarged cross-sectional view of a first terminal unit (400) illustrated in FIG. 6, and FIG. 8 is an enlarged cross-sectional view of a second terminal unit (500) illustrated in FIG. 6.

If a high-voltage disconnection or an overcharge of a secondary battery 1000 occurs, heat may be generated in the electrode assembly 100 and an electrolyte may decompose such that the internal pressure of the case 200 may increase. If the internal pressure of the case 200 exceeds a certain pressure (e.g., a preset pressure), the inversion plate 316 may become (e.g., may deform to become) convexly inverted toward the first terminal plate 430 as illustrated in FIGS. 6 and 7. While the inversion plate 316 and the cap plate 300 have the same polarity as each other, short circuiting may occur due to contact between the inversion plate 316 and the first terminal plate 430, each having different polarities from each other.

As illustrated in FIG. 8, when the short circuiting occurs between the inversion plate 316 and the first terminal plate 430, current may flow from the second electrode terminal 510 to the cap plate 300 via the second terminal plate 530.

Different from a conventional secondary battery in which current (e.g., short circuit current) flows only in one direction (e.g., along only the Y axis as illustrated in FIG. 8) from a terminal plate to a cap plate, in the secondary battery 1000 according to an embodiment of the present invention, the flow of current I is distributed in (e.g., occurs in) two directions (e.g., along both the X and Y axes as illustrated in FIG. 8) through the top plate 520 and the cap plate 300 at the second recessed groove 320, thereby suppressing heat from being generated (e.g., reducing heat generated) during the short circuiting.

While aspects of the present invention have been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A secondary battery comprising:
  an electrode assembly comprising a first electrode plate, a second electrode plate, and a separator between the first electrode plate and the second electrode plate;
  a case accommodating the electrode assembly and having an opening at one side thereof;
  a cap plate closing the opening of the case and having a first recessed groove and a second recessed groove at an outer surface thereof, the first and second recessed grooves being at opposite ends of the cap plate in a length direction of the cap plate, a first penetration opening being in the cap plate at one end of the second recessed groove;

a first terminal unit electrically connected to the first electrode plate and coupled to the cap plate at the first recessed groove; and a second terminal unit electrically connected to the second electrode plate and comprising:

a second electrode terminal protruding outside of the case through the first penetration opening;

a second terminal plate electrically connected to the second electrode terminal; and a top plate in the second recessed groove and contacting a bottom surface of the second terminal plate and peripheral surfaces and a bottom surface of the second recessed groove, the top plate being smaller than the second recessed groove in the length direction and electrically connecting the second terminal plate and the cap plate to each other.

2. The secondary battery of claim 1, wherein the first terminal unit comprises:

a first electrode terminal electrically connected to the first electrode plate and extending through the cap plate to protrude outside of the case;

a first terminal plate electrically connected to the first electrode terminal; and an insulation member in the first recessed groove and surrounding peripheral surfaces and a bottom surface of the first terminal plate.

3. The secondary battery of claim 1, wherein a protruding terminal protrudes from and extends along edges of an outer surface of the top plate such that the second terminal plate is on the outer surface of the top plate and peripheral surfaces of the second terminal plate are surrounded by the protruding terminal, and wherein the outer surface of the top plate and the outer surface of the cap plate are substantially coplanar.

4. The secondary battery of claim 1, wherein the top plate has:

a second penetration opening at one end of the top plate; and a third penetration opening at another end of the top plate, wherein a coupling opening is at one end of the second terminal plate and the second electrode terminal extends through the coupling opening and is riveted to the second terminal plate, and wherein a protrusion protrudes from a bottom surface of another end of the second terminal plate and extends into the third penetration opening.

5. The secondary battery of claim 1, wherein an inner surface of cap plate below the second recessed groove protrudes toward the electrode assembly.

* * * * *